Feb. 3, 1959 R. G. ALTHERR 2,872,182
TORSION SPRING VEHICLE SUSPENSION
Filed June 8, 1955 2 Sheets-Sheet 1

INVENTOR.
Russell G. Altherr
BY
Walter L. Schlegel, Jr. Atty.

Witness:
Ralph McFaust

Feb. 3, 1959 — R. G. ALTHERR — 2,872,182
TORSION SPRING VEHICLE SUSPENSION
Filed June 8, 1955 — 2 Sheets-Sheet 2

INVENTOR.
Russell G. Altherr
BY
Walter L. Schlegel, Jr. Atty.

Witness:
Ralph M Faust

United States Patent Office 2,872,182
Patented Feb. 3, 1959

2,872,182

TORSION SPRING VEHICLE SUSPENSION

Russell G. Altherr, Hazelcrest, Ill., assignor to American Steel Foundries, Chicago, Ill., a corporation of New Jersey Application June 8, 1955, Serial No. 514,063

4 Claims. (Cl. 267—58)

This invention relates to an axle assembly wherein a helical torsion spring is used to resiliently support a related vehicle body, and more particularly to the manner of engagement of the spring with related parts of the assembly.

It is a general object of this invention to provide a novel form of spring engagement means which will remedy several causes of spring fatigue and failure.

Another object of this invention is the utilization of a spring end fastening for a rectangular bar spring which will permit a decrease in length of the spring and a reduction in longitudinal bending moment of the spring.

Another object is to provide a torsional suspension spring wherein the hooked ends of the spring are formed below the radially outer surface of the spring so that torsional bending moments will be minimized in the terminal coils and undesirable secondary moments will be eliminated.

Other objects and advantages will become apparent from the following specification and the accompanying drawings, wherein.

Figure 1:
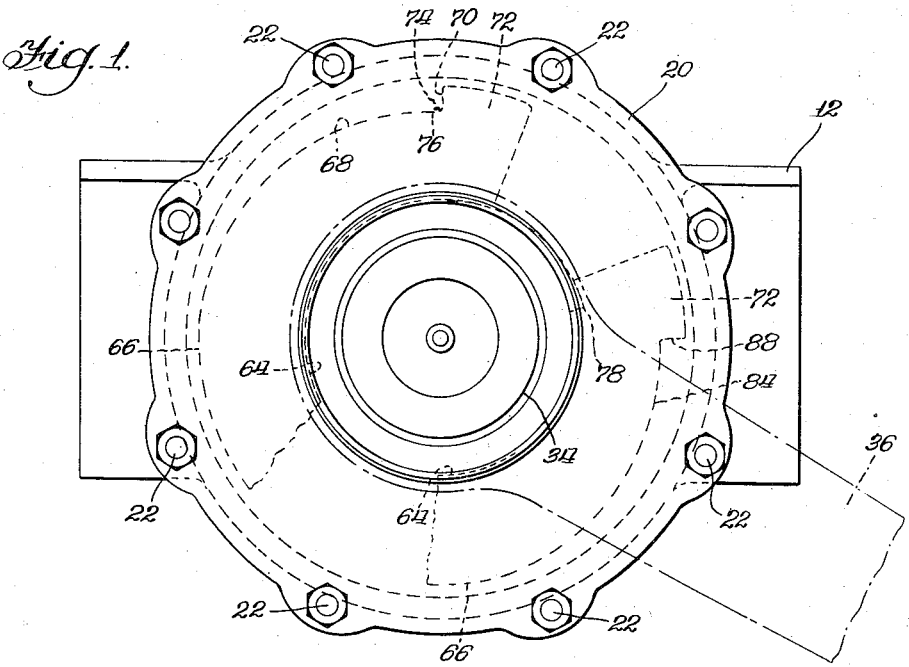
Figure 1 is an end elevational view of the preferred embodiment of the invention.
Figure 2:
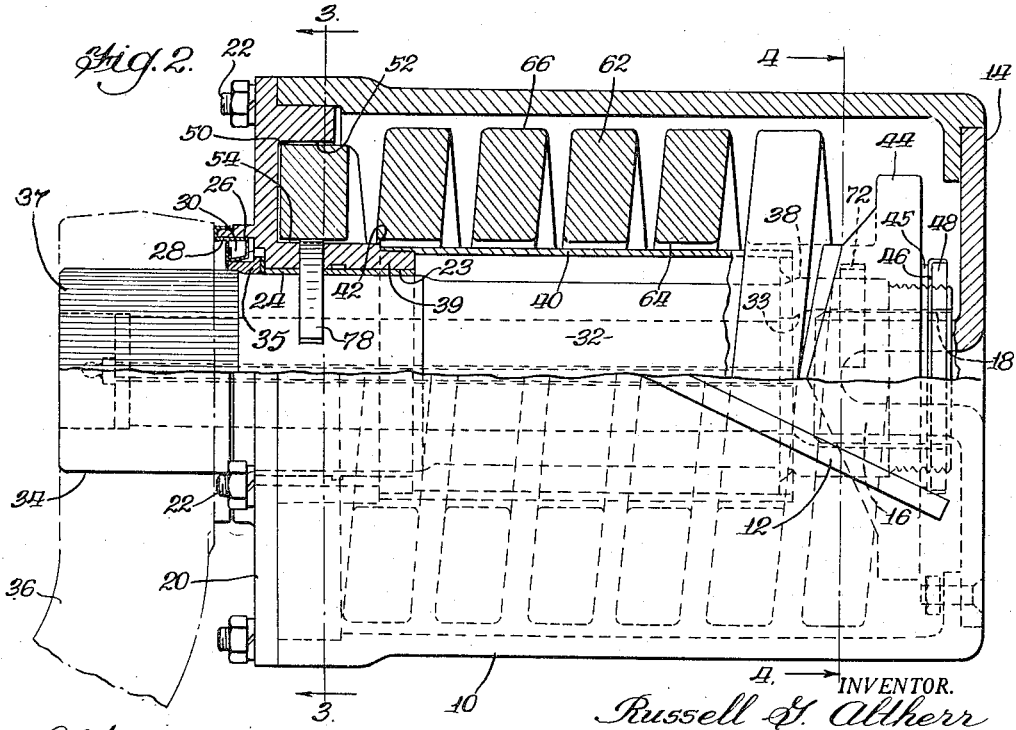
Figure 2 is a side elevational view, partly in section of the embodiment of Figure 1.

Referring to the drawings, and particularly to Figures 1 and 2, it will be seen that the novel device is comprised of a generally cylindrical housing 10, which is provided with mounting flanges 12 for attachment in any efficient manner to the underside of a related vehicle. The housing 10 is closed at one end by a trunnion plate 14 having an inwardly projecting portion 16 carrying a sleeve bearing 18. The opposite end of the housing 10 is provided with a housing cap 20 which is secured to the housing, preferably by a plurality of stud bolts 22. The cap 20 has an opening 23 therethrough carrying a sleeve bearing 24. Projecting outwardly from the bearing cap is an annular portion 26 accommodating a conventional seal 30. Carried in the housing is a shaft 32 having an internal bore 33 at one end thereof, which is operatively carried on the sleeve bearing 18 adjacent the closed end of the housing. The opposite end of the shaft 32 is supported by bearing means 24 and projects outwardly of the housing. A spacer 35 takes inward thrust and also engages the inner surface of the seal 30. The portion of the shaft 34, which projects outwardly of the housing carries a crank arm 36, which may be secured to the shaft by any desired means. However, in the preferred embodiment both the portion 34 and the crank arm 36 are provided with serrations 37, and the crank arm is first heated and then shrunk on the shaft.

Referring specifically to Figure 2, it will be seen that the housing cap 20 is provided with an inboardly projecting portion 39 having a shoulder 42, around and against which there is mounted a sleeve 40. The opposite end of the sleeve is supported by a spring clip 44 which is mounted on the end of the shaft 32 and secured, for rotation therewith, by means of interengaging splined portions 38 on the outer periphery of the shaft and the inner periphery of the spring clip. The spring clip 44 is, in turn, held in place on the shaft by a washer 45, a lock washer 46 and a nut 48 which is threaded onto the extreme end of the shaft.

Figure 3:
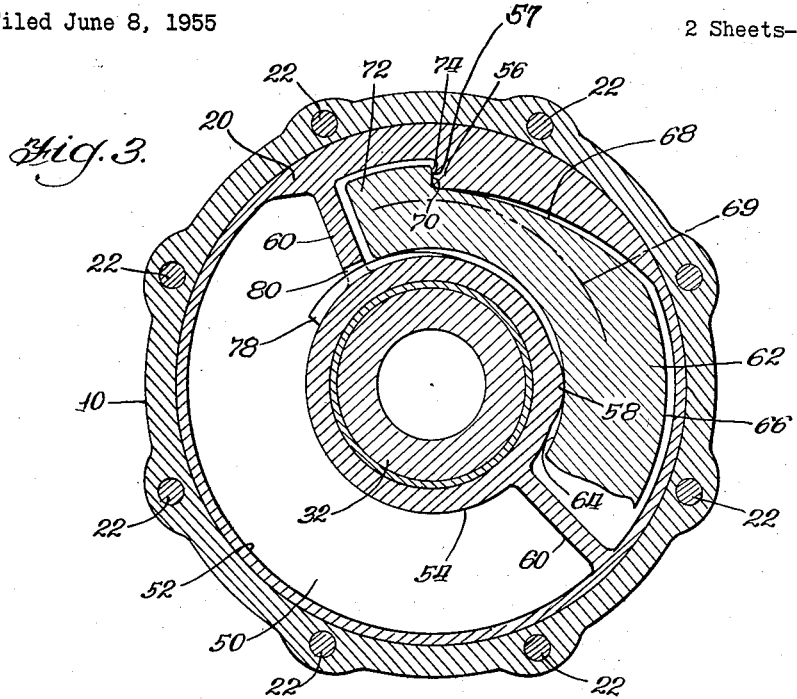
Figure 3 is a section taken at lines 3—3 of Figure 2, showing the manner in which the hooked ends of the spring are engaged by the housing cap.

Referring particularly to Figure 2 and Figure 3, the housing cap 20 is provided with an annular groove 50 facing inwardly of the housing. The groove 50 has an outer face 52 and an inner face 54. The outer face 52 of the annular groove 50 is provided with an abutment 56 having a substantially radially disposed abutment surface 57 adapted for engagement with a portion of a spring 62, as will be more clearly described.

Angularly displaced approximately ninety degrees from the abument 56 is a radial protrusion 58 extending outwardly from inner face 54 of the groove. The annular groove 50 may be spanned by one or more ribs 60. Surrounding the shaft is a helical torsion spring 62 having a radially inner surface 64 and a radially outer surface 66. The spring may be of any desired cross section, but preferably is either square or generally rectangular. The radially outer surface 66 (Figure 3) curves inwardly toward the radially inner surface, as indicated at 68. This inwardly curving portion is disposed over approximately one-quarter turn of the terminal coil of the spring, and curves inwardly toward the spring axis to a point preferably approximately coincident with the center line 69 of the coils of the spring or at least sufficiently to provide an adequate abutment as described hereinafter. The surface then turns outward to provide a radial face 70 and terminates at a point below the radially outer surface 66. There is thereby provided a hooked end 72 disposed entirely within the path of generation of the helical coil of the spring and having a notch 74 comprised of a substantially tangential face 68 and radial face 70. The hooked end of the spring is preferably formed by forging a straight bar to the desired shape, subsequently coiling the bar into a helical spring with the desired number of convolutions. The forging process accommodates accurate forming of the terminal coil and also permits the radius at the apex 76 of the notch to be kept exceedingly small; in fact, considerably smaller than the cross section of the spring material. In prior art devices of this type, the hooked ends of the spring have been formed by bending the spring itself either outwardly, parallel to the axes of the spring, or radially outward of the spring coils. The disadvantage to either of these types of construction are, first, that the radius at the bend is comparatively larger, and second, that with the radial hook, the hooked portion extends radially outward beyond the spring coils. When springs of this type are mounted in a vehicle suspension, and loads applied thereto, undesirable bending moments are induced which tend to overstress and thereby weaken the spring, and ultimately cause spring failure. Utilizing the type of hooked end disclosed in this invention, the force applied to the hooked end is very near to the center line of the coils and only the desired torsional bending moment is induced in the spring. This permits a lighter spring to be used and greatly decreases the possibility of spring failure. It should be noted that one of the ribs 60 in the cap is disposed immediately adjacent the extreme end of the hook 72 to provide thereby a stop preventing counter rotation of the spring relative to the cap.

To insure proper engagement of the radial face 70 with the abutment surface 57, there is provided an arcuate key 78, wedged between the shaft 32 and the radially inner surface of the spring 62. An opening 80 is provided in the rib 60 which is adjacent the spring end to allow for insertion of the key.

Figure 4:
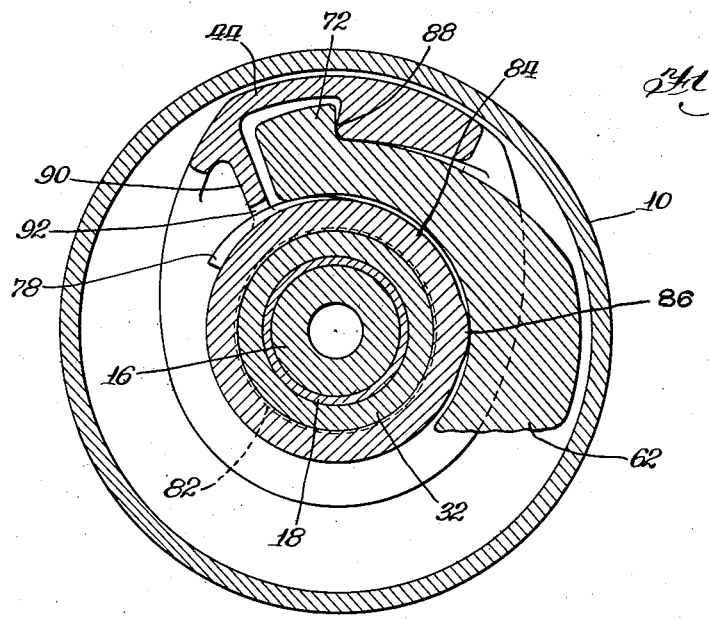
Figure 4 is a section taken at lines 4—4 of Figure 2, showing the manner in which the hooked ends of the spring are engaged by the spring clip.

Referring to Figures 2 and 4, spring clip 44, which is splined to the shaft, is provided with an axially disposed annular shelf 84 having thereon a radial protrusion 86 adapted to engage the inner surface of the spring 62. Angularly displaced approximately ninety degrees therefrom, there is provided an abutment surface 88 which is radially spaced from the shelf 84, and is adapted for engagement with a hooked end 72 on the spring, in the same manner as described above relative to the cap. The spring clip is provided with a rib 90, which acts as a stop against counter-rotation of the spring relative to the spring clip, and this rib is provided with an opening 92 through which is inserted an arcuate wedge key 78, wedged between the shaft and the inner surface of the spring, as described above.

In operation, the housing spring cap and the related end of the spring remain relatively motionless as regarding angular movement. However, the weight of the vehicle, or the wheel action due to the particular road conditions, urge the wheel to move angularly about the axis of the shaft 32. This angular motion is transmitted through the crank arm to the shaft, the spring clip and the related end of the torsion spring. A torsional stress is thereby set up in the spring which resists the angular movement, and the vehicle is thereby resiliently supported.

I claim:

1. A torsion spring suspension for a related vehicle body comprising, a housing secured to the body, said housing having one open and one closed end, said closed end providing bearing means inwardly thereof, a shaft supported on said bearing means and projecting through said open end, a housing cap at the open end, said cap providing additional bearing means for said shaft, an inwardly facing annular groove in the cap, an abutment surface extending toward the shaft from the outer face of said groove, a radial protrusion on the inner face of the groove angularly displaced from said abutment surface approximately ninety degrees, a spring clip secured to the shaft adjacent the closed end of the housing, a shelf on said clip having a radial protrusion thereon, said clip having an abutment surface radially spaced from said shelf and angularly displaced approximately ninety degrees from said second mentioned protrusion, a rectangular section spring surrounding said shaft, the inner surface of the terminal coils of said spring being supported by said protrusions, said spring having each of its extreme ends formed into a hook having a face extending substantially radially outward from the spring body to form therewith a notch, said spring being disposed so that said notches mutually engage said surfaces, and a pair of arcuate wedge keys disposed between the shaft and spring maintaining said engagement.

2. A torsion spring suspension for a related vehicle body comprising, a housing secured to the body, a shaft carried in said housing, a spring clip secured to the shaft adjacent one end of the housing, said clip being provided with an axially disposed shelf having a radial protrusion thereon, an abutment surface radially aligned with and spaced from said shelf, a cap secured to the other end of said housing, said cap accommodating bearing means for said shaft, said cap having an inwardly facing annular groove, a radial protrusion on the inner wall of said groove, an abutment surface on the outer wall of said groove displaced approximately ninety degrees from the associated protrusion, a rectangular section spring surrounding said shaft, the terminal coils of said spring being supported on the related protrusions, the extreme ends of said spring each being formed onto a hook having a face extending substantially radially outward from the spring body and parallel to the spring axis for engagement with said surfaces.

3. In a torsion spring for a vehicle suspension, a spring wire having a rectangular cross section, said wire being wound into a plurality of helical coils having a radially inner surface and a radially outer surface, the radially outer surface of the last quarter turn of each terminal coil curving inwardly toward the radially inner surface to a point approaching the center line of the wire, then turning radially outward to a point below the radially outer surface.

4. In a torsion spring for a vehicle suspension, a spring wire wound into a plurality of helical coils and presenting a radially inner surface and a radially outer surface, the radially outer surface of the last quarter turn of each terminal coil curving inwardly toward the radially inner surface to a point approaching the center line of the wire, then turning outwardly to a point below the radially outer surface.

References Cited in the file of this patent

UNITED STATES PATENTS

| | | |
|---|---|---|
| 550,019 | Gray et al. | Nov. 19, 1895 |
| 768,883 | Nelson | Aug. 30, 1904 |
| 1,956,877 | Prouty et al. | May 1, 1934 |
| 2,688,481 | Bergquist | Sept. 7, 1954 |

FOREIGN PATENTS

| | | |
|---|---|---|
| 39,987 | France | Dec. 28, 1931 |
| | (1st addition to No. 707,137) | |